R. M. LAFFERTY.

Assignor to Smith & Lafferty.

PUMP.

No. 7,678. Reissued May 15, 1877.

Attest:
R. T. Dyer.
S. W. Seely.

Inventor:
Robert M. Lafferty
by Geo. W. Dyer & Co.
Attys.

N. PETERS, PHOTO-LITHOGRAPHER, WASHINGTON, D. C.

UNITED STATES PATENT OFFICE.

ROBERT M. LAFFERTY, OF TOLEDO, OHIO, ASSIGNOR TO SMITH & LAFFERTY.

IMPROVEMENT IN PUMPS.

Specification forming part of Letters Patent No. 127,173, dated May 28, 1872; reissue No. 7,678, dated May 15, 1877; application filed July 22, 1873.

DIVISION C.

*To all whom it may concern:*

Be it known that I, ROBERT M. LAFFERTY, of Toledo, in the county of Lucas and State of Ohio, have invented a new and useful Improvement in Wood Pumps; and I do hereby declare that the following is a true and accurate description thereof, reference being had to the accompanying drawing, forming a part of this specification.

The nature of this invention relates to certain improvements in the construction of wood pumps; and it consists in the peculiar fulcrum-ears in which the lever is pivoted, having a horizontal socket to receive the fulcrum-pin of the lever, and a stud projecting into the pump-head.

Figure 1:
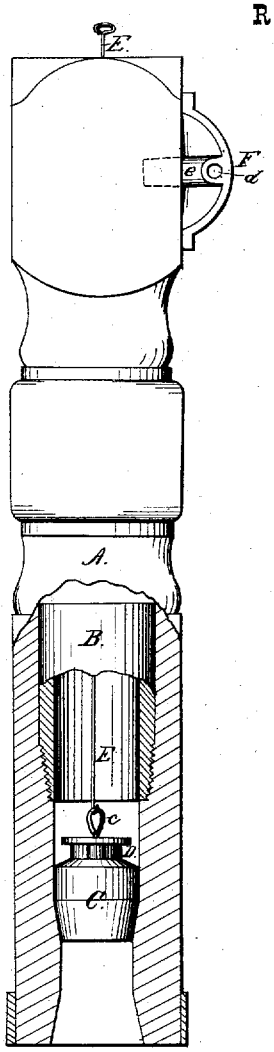
Figure 2:
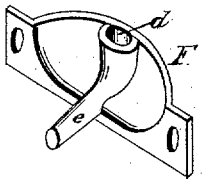

In the drawings, Figure 1 is a side view of a pump, partly in section, with one of my improved fulcrum-ears applied to the head thereof, and Fig. 2 a perspective view of one of the ears detached.

A is the stock of a wood pump, of any ordinary or convenient construction. At each side of the vertical slot in the pump-head, in which the lever vibrates, I secure a cast-metal ear, F, of the form shown, having a horizontal socket, *d*, which receives the fulcrum-pin of the lever. The inner face of each ear is cast with one or more projecting studs, *e*, which are inserted in holes made in the pump-head to receive them, the ear being secured to the head by a simple wood screw at each end. This arrangement of the studs *e* transmits the strain of the lever to the pump-head, while the light castings are cheaper than the brackets heretofore employed as a fulcrum for such lever.

What I claim as my invention, and desire to secure by Letters Patent, is—

The combination, with a pump-head, of the cast-metal fulcrum-ears F, each provided with the horizontal socket *d* and stud *e*, substantially as described and shown.

R. M. LAFFERTY.

Witnesses:
T. J. MCDONNELL,
E. D. MOORE.